United States Patent [19]

Springer et al.

[11] 4,147,897

[45] Apr. 3, 1979

[54] CIRCUIT FOR TELEPHONE AUXILIARY EXCHANGES HAVING DELAYED CONNECTION OF A BUSY SIGNAL SET

[75] Inventors: Norbert Springer, Taufkirchen; Walter Oberhauser, Wolfratshausen; Joachim Sommer, Munich, all of Fed. Rep. of Germany

[73] Assignee: Siemens Aktiengesellschaft, Berlin & Munich, Fed. Rep. of Germany

[21] Appl. No.: 817,567

[22] Filed: Jul. 21, 1977

[30] Foreign Application Priority Data

Jul. 26, 1976 [DE] Fed. Rep. of Germany ....... 2633515

[51] Int. Cl.² .............................................. H04Q 3/00
[52] U.S. Cl. ................................................ 179/18 AB
[58] Field of Search ..................................... 179/18 AB

[56] References Cited

U.S. PATENT DOCUMENTS 4,009,351 2/1977 Hofstetter ................. 179/18 GE

*Primary Examiner*—William C. Cooper
*Attorney, Agent, or Firm*—Hill, Gross, Simpson, Van Santen, Steadman, Chiara & Simpson

[57] ABSTRACT

A busy signal connecting set is immediately released by the disengagement of a connecting station participating in an existing connection, and a state of interception is established for the subscriber circuit of the subscriber station which has not yet released. The subscriber circuit is connected with a house set for the purpose of connecting the busy signal by way of time switching equipment which is activated after a delay time in response to production of the state of interception.

1 Claim, 1 Drawing Figure

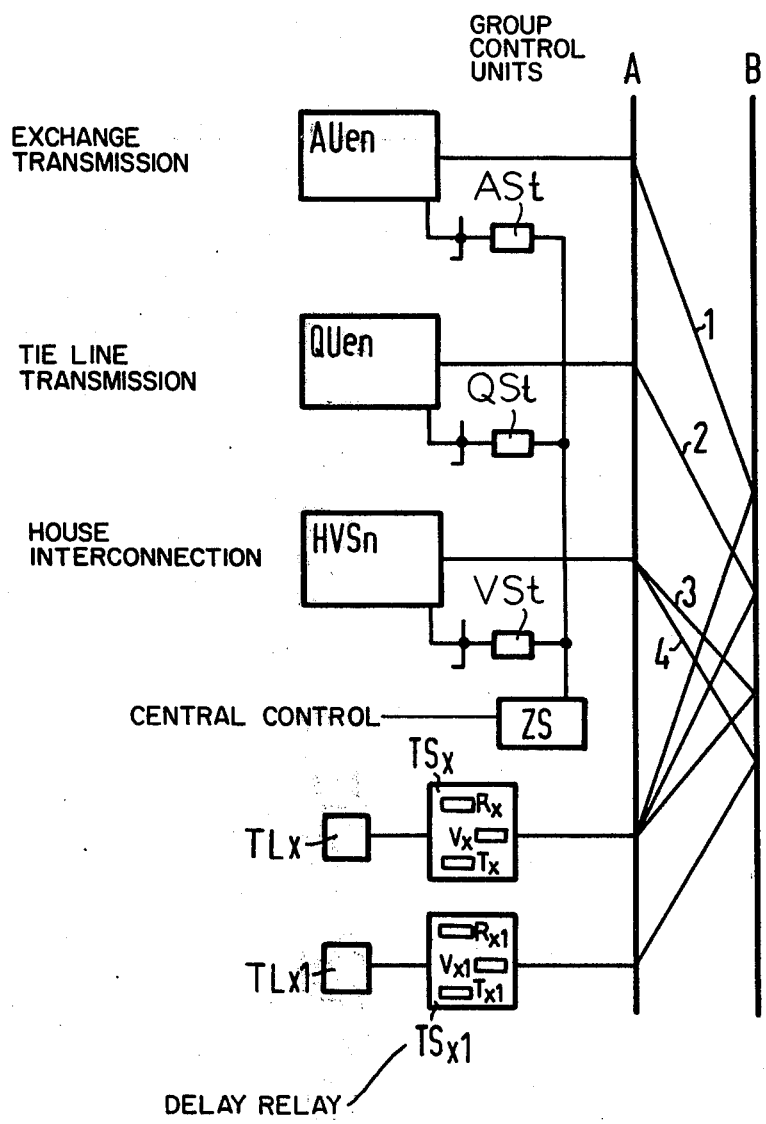

CIRCUIT FOR TELEPHONE AUXILIARY EXCHANGES HAVING DELAYED CONNECTION OF A BUSY SIGNAL SET

BACKGROUND OF THE INVENTION

1. Field of the Invention

This invention relates to a circuit arrangement for a telecommunication system, and more particularly to a circuit arrangement for a telephone auxiliary exchange having a delayed connection of a busy signal after the release of the busy connection set on the basis of a release of one of the two connecting stations involved in a connection. The present invention is contemplated for use in a system such as that disclosed in U.S. Pat. No. 4,009,351.

2. Description of the Prior Art

German Auslegeschrift No. 1,242,275, incorporated herein by this reference, discloses a circuit arrangement in which the busy signal is transmitted to the calling subscriber from a busy signal set when a connection does not take place, or on the occurrence of a back release of a connection generated or to be generated by means of a central setting device, the busy signal requesting the subscriber to hang up his receiver and to therewith release the total connection. In this known arrangement, the connection of the busy signal set results after the release of the busy connection set, and is done for the purpose of providing the busy signal to a calling subscriber and for monitoring to determine hang up by the calling subscriber. Before the release of the connection set is induced, the subscriber station, not yet released, is first identified in order to control the connection of this subscriber location with a free busy signal set with the aid of the central setting device and with the utilization of selective switching equipment of a search device and for the subsequent release of the connection set.

In this known arrangement, time switching equipment is assigned to the connection set to be released, the time switching equipment capable of delaying the start of the central search equipment, so that the connection of the special busy signal set can be saved when the respective subscriber immediately hangs up his receiver after determining the end of the connection.

The central control equipment in this known arrangement is to be utilized for the recoupling of busy signal sets. A reduction of the holding time of the connection sets is only partially obtained by the time delay introduced for the connection of the busy signal set. The additional load time in the coupling field due to the longer holding of the coupling points for switch-through to the connecting set can also not be reduced.

It has been proven, for example in respect to the German Postal Service, that the number of house interconnection sets to be provided is greater than the traffic requires due to operating regulations. In contrast thereto, the number of exchange transmissions and tie line transmissions is precisely adjusted, for the most part, to the traffic increase. It has also been proven that with the release of a subscriber station which is part of a connection, the other subscriber station also definitely releases the connection, although such release is delayed. The time span between the release of the one, for example, the calling subscriber station, and the release of the other, for example the called subscriber station, can, however, be comparatively different and can also be comparatively great. This is the reason why one must provide a time span as large as possible for the time delay. This technique, however, would mean an even longer additional holding of the connecting sets and the coupling network in practice of the known technique.

SUMMARY OF THE INVENTION

The object of the present invention is to decrease the additional holding time of the connecting sets of any kind, exchange transmissions, tie line transmissions, house interconnection sets, etc. to the lowest possible measure.

This object is achieved in that the central control equipment immediately releases the busy connecting set (exchange transmission, tie line transmission, house interconnection set, etc.) by means of the release designation of a subscriber station participating in an existing connection and establishes a state of interception for the subscriber circuit of the subscriber station of the secondary exchange not yet releasing, and time switching equipment of the subscriber circuit is activated by the state of interception so produced causes the central control equipment to bring about switch-through—due to the existing circuit state in the subscriber circuit—to a free house interconnection set, as in an outgoing connection setup, for the purpose of connecting the busy signal.

With this technique, not only an additional holding time of the connecting sets of any type—exchange transmissions, tie line transmissions, house interconnection sets—as they are known in the prior art, are avoided and also the coupling field, particularly, is immediately relieved and not truly called upon until the subscriber station which has not yet released the connection, does not hang up the receiver within the maximum delay time provided for that purpose. Only in that case will a new connection to a free house interconnection set be required. However, this connection can proceed as an outgoing connection, i.e. without alteration of the functions of the central control equipment. The particular state of interception of the subscriber circuit brings about the busy signal connection by way of the house interconnection set. Thereby, not only a special method for establishing the connection between a subscriber station and a house interconnection set which provides the busy signal is avoided by the additional identification of the subscriber station which was connected with the connecting set, but also no special busy signal sets are required. On the contrary, the normal presence of more house interconnecting sets than are required, in regard to traffic, are utilized.

Those skilled in the art of telephony will readily appreciate that the connecting sets discussed herein may advantageously be in the form of trunks, tie lines and the like which are well known in the art for establishing telephonic connections.

BRIEF DESCRIPTION OF THE DRAWINGS

Other objects, features and advantages of the invention, its organization, construction and operation will be best understood from the following detailed description, taken in conjunction with the accompanying drawing, on which there is a single FIGURE which illustrates, in schematic form, the present invention in the environment of a two stage connecting field.

Only details which are required for understanding the invention are illustrated, in that the apparatus involved is per se well known in the art and details concerning the operation of trunks, control equipment and the like is not deemed necessary for those skilled in the art.

Referring to the drawing, a two stage coupling field is illustrated for the purpose of simplicity. Only one exchange transmission device AUen of the respective present devices is illustrated, only one tie line transmission device QUen of the available tie line devices is illustrated, and only one house interconnection set HVSn and only one of the subscriber points TL are illustrated, multiple indications being provided to show additional trunks and the like. One subscriber circuit TSx is assigned to the subscriber station TLx.

Furthermore, it is assumed that a group control ASt, common to all exchange transmission devices, is respectively assigned for all exchange transmissions, a group control QSt is assigned to all tie line connections, a joint group control VSt is assigned to all house interconnection sets, and a group control TSt is assigned to all subscriber stations. These group controls provide the information of the transmission devices to the central control equipment ZS and receive the commands from the central control equipment ZS, which again brings about the alteration of switching states in the connecting sets, i.e. exchange transmissions devices, tie line devices, house interconnection sets, and the like, and also extend subscriber circuits and bring about the setting up of connections through the two-stage connecting field A, B by way of the central control equipment ZS.

In the connecting field illustrated, the connection routes possible are illustrated between a subscriber TLx and an exchange transmission device AUen of a tie line transmission device QUen and a house interconnection set HVSn, and are respectively referenced 1, 2 and 3. The through-connection from the house interconnection set to a called subscriber station, for example the station TLx1, is referenced 4.

If it is assumed that the subscriber station TLx1 has, for example, a connection to a different secondary exchange by way of a tie line transmission device, and the subscriber of the other, secondary exchange releases first, the release characteristic is received in the tie line transmission device and is recognized by the group control QUen. The group control effects the release of the tie line transmission device and effects the establishment of a state of reception in the subscriber circuit TSx1 by way of the central control equipment ZS. In the subscriber line circuit TSx1, for example, the relays R and T are simultaneously actuated, as is well known in the art. A time switching device Vx, for example a time delay relay device, also becomes simultaneously activated with the establishment of the connecting state in the subscriber circuit, the time switching device operating to effect a renewed request for the central control equipment ZS after a predetermined time and effects a connection of a free house interconnection set HVSn to the subscriber circuit TSx1—after identifying this subscriber station TLx1—with an outgoing holding of that subscriber station. Thus, no specific measures for the connecting of the house interconnection set, for example, HVSn, to the subscriber circuit are required in the central control equipment ZS. After the connection of the free house interconnection set HVSn to the subscriber circuit TSx1, the state of interception of the subscriber circuit TSx1 is signaled to the connecting set control VSt, and then the busy signal connection is established by the connecting set control VSt in the house interconnection set HVSn by means of switching-on the busy signal transmission and connecting means.

Therefore, in this manner not only the additional holding time of the present connecting sets, i.e. exchange transmission devices, tie line transmission devices and house interconnection devices, after releasing a subscriber station nor appertaining to the secondary exchange, or effects the immediate release of the busy connecting set of a subscriber station participating in the connection of the house interconnection traffic, and the busy connection points are also released for the connection of this connecting set with the subscriber station which is not yet releasing. Also, the additional expense for the switching to a house interconnection for the purpose of providing the busy signal in the central control equipment ZS is avoided. Although additional expense is required for each subscriber set, however, this expense only resides in the provision of a delay circuit per subscriber set. This expense, however, is exceedingly small when one practices the invention through the utilization of electronic switching means.

Although we have described our invention by reference to a particular illustrative embodiment thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a telecommunications exchange system in which, in response to a release signal produced as a result of a subscriber station releasing an existing connection, a connection set of the system seized for that connection is immediately released, in which the system includes internal connection sets, and in which a central control device of the system establishes an intercept state engaging the subscriber circuit of another subscriber station involved in that connection and not yet released, the improvement therein comprising:

delay means in said subscriber circuit; and switching means in said subscriber circuit connected to said delay means and operable in response to the establishment of the intercept state, delayed by said delay means, to send call signals to the central control device which is responsive to the call signals to establish a connection of the subscriber circuit to a free internal connection set of the system, as would normally be the case in an outgoing seizure of the subscriber circuit, for connection of a busy signal instead of dial tone to the subscriber circuit not yet released via the just-connected internal connection set.

* * * * *